(12) United States Patent
Choi et al.

(10) Patent No.: US 10,224,295 B2
(45) Date of Patent: Mar. 5, 2019

(54) DEVICE AND METHOD FOR GENERATING IDENTIFICATION KEY

(71) Applicant: ICTK Holdings Co., Ltd., Seongnam-si (KR)

(72) Inventors: Byong Deok Choi, Seoul (KR); Dong Kyue Kim, Seoul (KR)

(73) Assignee: ICTK Holdings Co., Ltd., Seongnam-si (KR)

( * ) Notice: Subject to any disclaimer, the term of this patent is extended or adjusted under 35 U.S.C. 154(b) by 195 days.

(21) Appl. No.: 14/916,492

(22) PCT Filed: Feb. 17, 2014

(86) PCT No.: PCT/KR2014/001255
§ 371 (c)(1),
(2) Date: Mar. 3, 2016

(87) PCT Pub. No.: WO2015/034147
PCT Pub. Date: Mar. 12, 2015

(65) Prior Publication Data
US 2016/0211232 A1 Jul. 21, 2016

(30) Foreign Application Priority Data
Sep. 3, 2013 (KR) .......... 10-2013-0105470

(51) Int. Cl.
*H01L 27/12* (2006.01)
*H01L 23/00* (2006.01)
(Continued)

(52) U.S. Cl.
CPC ............ *H01L 23/576* (2013.01); *G06F 21/73* (2013.01); *G09C 1/00* (2013.01); *H01L 27/0207* (2013.01);
(Continued)

(58) Field of Classification Search
CPC ............ H01L 27/0262; H01L 27/0623; H01L 27/0664; H01L 27/092; H01L 27/10802;
(Continued)

(56) References Cited

U.S. PATENT DOCUMENTS 5,023,691 A * 6/1991 Hagino ............... H01L 29/0696
257/139
6,161,213 A 12/2000 Lofstrom
(Continued)

FOREIGN PATENT DOCUMENTS

KR 1020090055994 A 6/2009
KR 101139630 B1 5/2012

OTHER PUBLICATIONS

ISA Korean Intellectual Property Office, International Search Report Issued in Application No. PCT/KR2014/001255, dated Jun. 3, 2014, WIPO, 5 pages.
(Continued)

*Primary Examiner* — Cory W Eskridge
(74) *Attorney, Agent, or Firm* — McCoy Russell LLP (57) ABSTRACT

Provided are a device and method for generating an identification key using process variation during a bipolar junction transistor (BJT) process. A BJT may be produced by designing such that the effective base width of the BJT is at least a first threshold value but not more than a second threshold value, or, such that the total of the width of a second depletion region formed by connection with a collector region and the width of a first depletion region formed by connection with an emitter region, within a base region, differs from the width of the base region by a value that is at least the first threshold value but not more than the second threshold value. Whether or not there is a short circuit between the emitter region and the collector region is stochastically generated, and if ordinary turn-on voltage is
(Continued)

not applied, whether or not there is a short circuit is identified.

4 Claims, 7 Drawing Sheets

(51) Int. Cl.
*G06F 21/73* (2013.01)
*H01L 27/02* (2006.01)
*G09C 1/00* (2006.01)
*H04L 9/08* (2006.01)

(52) U.S. Cl.
CPC .... *H04L 9/0866* (2013.01); *H01L 2924/0002* (2013.01); *H04L 2209/12* (2013.01)

(58) Field of Classification Search
CPC .............. H01L 27/0248; H01L 27/0255; H01L 27/0259; H01L 27/0274; H01L 27/0292; H01L 27/0605
USPC .............................. 257/17, 43, 125, 360, 370
See application file for complete search history.

(56) References Cited

U.S. PATENT DOCUMENTS

| | | |
|---|---|---|
| 2011/0317829 A1 | 12/2011 | Ficke et al. |
| 2012/0033810 A1 | 2/2012 | Devadas et al. |
| 2013/0322617 A1* | 12/2013 | Orshansky ............ H04L 9/3278 380/28 |

OTHER PUBLICATIONS

"Bipolar junction transistor," Wikipedia Website, Available Online at https://en.wikipedia.org/w/index.php?title=Bipolar_junction_transistor&oldid=569637252, As last edited Aug. 21, 2013, Retrieved Dec. 13, 2016, 17 pages.

"Transistor," Wikipedia Website, Available Online at https://en.wikipedia.org/w/index.php?title=Transistor&oldid=570361228, As last edited Aug. 27, 2013, Retrieved Dec. 13, 2016, 18 pages.

European Patent Office, Extended European Search Report Issued in Application No. 14842135.7, dated Dec. 21, 2016, Germany, 9 pages.

* cited by examiner

DEVICE AND METHOD FOR GENERATING IDENTIFICATION KEY

CROSS REFERENCE TO RELATED APPLICATIONS

The present application is a U.S. National Phase of International Patent Application Serial No. PCT/KR2014/001255, entitled "DEVICE AND METHOD FOR GENERATING IDENTIFICATION KEY," filed on Feb. 17, 2014, which claims priority to Korean Patent Application No. 10-2013-0105470, entitled "DEVICE AND METHOD FOR GENERATING IDENTIFICATION KEY," filed on Sep. 3, 2013, the entire contents of each of which are hereby incorporated by reference for all purposes.

TECHNICAL FIELD

The following description relates to a device and method for generating an identification key for hardware security, and more particularly, to a device and method for generating an identification key by implementing a physically unclonable function (PUF) based on a semiconductor process variation.

BACKGROUND ART

As an information-oriented society is being advanced, a necessity for protection of personal information is increasing. Also, there is a desire for a technology for building a security system configured to securely transmit the personal information by encrypting and decrypting the personal information.

Recently, various attacks, for example, a side channel attack or a reverse engineering attack, have been applied to an identification key stored in a computing device. For protection against the above attacks, a physical unclonable function (PUF) technology is being developed to securely generate and store an identification key.

A PUF may provide an identification key, that is, an unpredictable digital value. Individual PUFs may provide different digital values, even though an accurate manufacturing process is provided and the individual PUFs are manufactured through the same design and manufacturing process.

Accordingly, the PUF may be referred to as a "physical one-way function (POWF)" that is practically impossible to be duplicated.

The above characteristic of the PUF may be used to generate an identification key for security and/or authentication. For example, the PUF may be used to provide a unique key to distinguish devices from one another.

In Korean Patent Registration No. 10-1139630 (hereinafter, referred to as "'630 patent"), a method of implementing a PUF has been provided. The '630 patent discloses a method of probabilistically determining whether an interlayer contact or a via is formed between conductive layers of a semiconductor based on a semiconductor process variation.

DISCLOSURE OF INVENTION

Technical Solutions

According to an aspect of the present invention, there is provided a device for generating an identification key, the device including a bipolar junction transistor (BJT) having an effective base width equal to or greater than a first threshold and equal to or less than a second threshold, and a reader configured to determine whether an emitter region and a collector region of the BJT are shorted and to provide an identification key, when a base-emitter voltage of the BJT less than a predetermined potential difference is applied.

The first threshold may be a lower limit value of a range of the effective base width to allow a difference between a probability that the emitter region and the collector region are shorted and a probability that the emitter region and the collector region are not shorted to be within a predetermined error range, and the second threshold may be an upper limit value of the range.

The BJT may be designed so that the effective base width may be less than a value specified in a design rule, may be equal to or greater than the first threshold and may be equal to or less than the second threshold.

Whether the emitter region and the collector region are shorted may be randomly determined by a process variation in a manufacturing process of the BJT.

The BJT may include a parasitic BJT formed by at least one N+ region and at least one P+ region in a complementary metal-oxide semiconductor (CMOS) process.

According to another aspect of the present invention, there is provided a device for generating an identification key, the device including a BJT in which a difference between a width of a base region and a sum of a width of a first depletion region and a width of a second depletion region is equal to or greater than a first threshold and equal to or less than a second threshold, the first depletion region being formed by a junction between an emitter region and the base region and the second depletion region being formed by a junction between a collector region and the base region, and a reader configured to determine whether the emitter region and the collector region of the BJT are shorted and to provide an identification key, when a base-emitter voltage of the BJT less than a predetermined potential difference is applied.

The first threshold may be a lower limit value of a range of an effective base width to allow a difference between a probability that the emitter region and the collector region are shorted and a probability that the emitter region and the collector region are not shorted to be within a predetermined error range, and the second threshold may be an upper limit value of the range.

The BJT may be designed so that a width of the base region may be less than a value specified in a design rule and that the difference between the width of the base region and the sum of the width of the first depletion region and the width of the second depletion region may be equal to or greater than the first threshold and equal to or less than the second threshold.

According to another aspect of the present invention, there is provided a method of generating an identification key, the method including reading, by a reader, whether an emitter region and a collector region of a BJT are shorted in a state in which a base-emitter voltage of the BJT is maintained to be less than a predetermined potential difference, the BJT having an effective base width equal to or greater than a first threshold and equal to or less than a second threshold, and providing an identification key corresponding to the BJT based on a result of the reading.

The first threshold may be a lower limit value of a range of the effective base width to allow a difference between a probability that the emitter region and the collector region are shorted and a probability that the emitter region and the collector region are not shorted to be within a predetermined error range, and the second threshold may be an upper limit value of the range.

The BJT may be designed so that the effective base width may be less than a value specified in a design rule and that the effective base width may be equal to or greater than the first threshold and equal to or less than the second threshold.

Whether the emitter region and the collector region are shorted may be randomly determined by a process variation in a manufacturing process of the BJT.

The BJT may include a parasitic BJT formed by at least one N+ region and at least one P+ region in a CMOS process.

According to another aspect of the present invention, there is provided a method of manufacturing a device for generating an identification key, the method including forming a BJT so that an effective base width is equal to or greater than a first threshold and equal to or less than a second threshold, and forming a reader configured to determine whether an emitter region and a collector region of the BJT are shorted and to provide an identification key, when a base-emitter voltage of the BJT less than a predetermined potential difference is applied.

The first threshold may be a lower limit value of a range of the effective base width to allow a difference between a probability that the emitter region and the collector region are shorted and a probability that the emitter region and the collector region are not shorted to be within a predetermined error range, and the second threshold may be an upper limit value of the range.

The BJT may be designed so that the effective base width may be less than a value specified in a design rule, may be equal to or greater than the first threshold and may be equal to or less than the second threshold.

BEST MODE FOR CARRYING OUT THE INVENTION

Hereinafter, some embodiments will be described in detail with reference to the accompanying drawings. The scope of the right, however, should not be construed as limited to the embodiments set forth herein. Regarding the reference numerals assigned to the elements in the drawings, it should be noted that the same elements will be designated by the same reference numerals.

Figure 1:
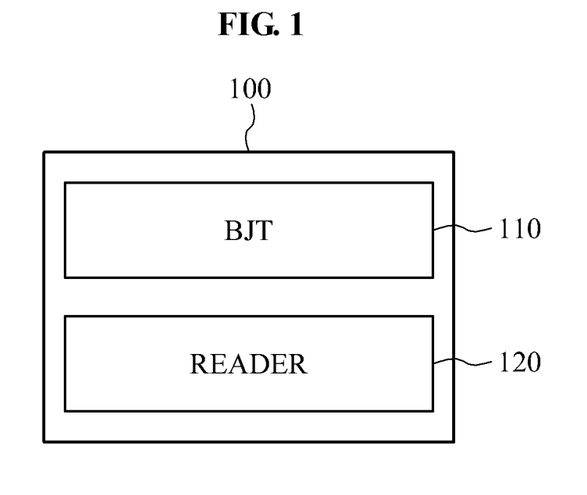
FIG. 1 is a block diagram illustrating of a device for generating an identification key according to an embodiment.

FIG. 1 is a block diagram illustrating of a device 100 for generating an identification key according to an embodiment.

The device 100 may include a bipolar junction transistor (BJT) 110 and a reader 120. An electrical characteristic of the BJT 110 may be determined by a process variation.

The BJT 110 may include a collector region, a base region and an emitter region. In a BJT, a depletion region may be formed by a P-N junction between a collector region and a base region, and a depletion region may be formed by a P-N junction between the base region and an emitter region.

Generally, a BJT may be designed so that the above depletion regions are included in a base region based on a process parameter, for example, semiconductor materials or a doping concentration.

For example, when a BJT is manufactured by applying a typical process parameter, and when a typical turn-on voltage is not supplied to a base region and an emitter region, the BJT may be turned off and a current may not flow between the emitter region and a collector region.

The typical turn-on voltage may be understood as a bias voltage applied to the base region to turn on the BJT in an application according to a related art in which the BJT is used as a typical semiconductor transistor. The turn-on voltage of the BJT may be readily understood by one of ordinary skill in the art, and accordingly further description thereof is omitted.

On the contrary, a BJT may be manufactured by applying different doping concentrations or different widths of a base region, instead of applying the typical process parameter, in a design process and/or a manufacturing process.

In an example, a BJT may be manufactured so that an effective base width may be less than a typical value. The effective base width may refer to a width of a base region between a first depletion region and a second depletion region. The first depletion region may be formed by a junction between an emitter region and the base region, and the second depletion region may be formed by a junction between a collector region and the base region.

For example, when the effective base width is less than the typical value, a distance between the first depletion region and the second depletion region may decrease. In this example, when the first depletion region and the second depletion region overlap, the collector region and the emitter region may be shorted even though a voltage equal to or less than a typical turn-on voltage is applied between the base region and the emitter region. Thus, a current may flow due to punch-through.

According to embodiments, the effective base width may be determined based on a process parameter, and the like, and/or may be determined to be equal to or less than a found threshold. In a random portion of a plurality of BJTs, an emitter region and a collector region may be shorted and a current may be generated due to punch-through. In another portion of the BJTs, an emitter region and a collector region may be open and the current may not be generated.

A lower limit of the effective base width may guarantee that a short circuit between an emitter and a collector does not occur. On the contrary, an upper limit of the effective base width may guarantee that the short circuit between the emitter and the collector occurs. For example, when the effective base width is greater than the lower limit and less than the upper limit, the short circuit between the emitter and the collector may probabilistically occur.

More specifically, the effective base width may be determined in a range that allows a probability that a current is generated due to punch-through between a collector and an emitter to be about 50%, however, there is no limitation thereto.

However, because it is difficult to generate a current by punch-through exactly at about 50% in an actual process, the first threshold and the second threshold may be set so that a probability of generation of a current by punch-through is closest to 50% by repeating a process of manufacturing and measuring various effective base widths to adjust the effective base width.

Here, for the first threshold and the second threshold, the first threshold and the second threshold may be a lower limit value and an upper limit value, respectively, in a range of the effective base width in which a difference between a probability that a collector region and an emitter region are shorted and a probability that the collector region and the emitter region are not shorted is within a predetermined error range. Accordingly, the collector region and the emitter region may be manufactured so that whether the collector region and the emitter region are shorted may be randomly determined.

In another example, a BJT may be manufactured so that a difference between a width of a base region and a sum of a width of a first depletion region formed by a junction between an emitter region and the base region and a width of a second depletion region formed by a junction between a collector region and the base region may be equal to or greater than a first threshold and equal to or less than a second threshold.

In this example, when the BJT is turned off due to a decrease in a distance between the first depletion region and the second depletion region, the collector region and the emitter region may be randomly shorted and a current may flow.

The BJT may be manufactured so that the difference between the width of the base region and the sum of the width of the first depletion region formed by the junction with the emitter region and the width of the second depletion region formed by the junction with the collector region may be equal to or greater than the first threshold and equal to or less than the second threshold. The above thresholds may be set to values allowing a difference between a probability that the collector region and the emitter region are shorted and a probability that the collector region and the emitter region are not shorted to be within a predetermined error range, and thus it is possible to further ensure randomness of whether the collector region and the emitter region are shorted.

When the sum of the width of the first depletion region and the width of the second depletion region is greater than the width of the base region, the collector region and the emitter region may be shorted and a current may flow at all times even though the BJT is turned off.

A lower limit of the difference between the width of the base region and the sum of the width of the first depletion region and the width of the second depletion region may guarantee that a short circuit between an emitter and a collector does not occur. On the contrary, an upper limit of the difference between the width of the base region and the sum of the width of the first depletion region and the width of the second depletion region may guarantee that the short circuit between the emitter and the collector occurs.

For example, when the difference between the width of the base region and the sum of the width of the first depletion region and the width of the second depletion region is greater than the lower limit and less than the upper limit, the short circuit between the emitter and the collector may probabilistically occur.

More specifically, the difference between the width of the base region and the sum of the width of the first depletion region and the width of the second depletion region may be determined in a range of the difference between the width of the base region and the sum of the width of the first depletion region and the width of the second depletion region to allow a probability that a current is generated due to punch-through between a collector and an emitter to be about 50%, however, there is no limitation thereto.

However, because it is difficult to generate a current by punch-through exactly at about 50% in an actual process, the first threshold and the second threshold may be set so that a probability of generation of a current by punch-through is closest to 50% by repeating a process of manufacturing and measuring various widths of the first depletion region and various widths of the second depletion region.

Here, for the first threshold and the second threshold, the first threshold and the second threshold may be a lower limit value and an upper limit value, respectively, in a range of the effective base width in which a difference between a probability that a collector region and an emitter region are shorted and a probability that the collector region and the emitter region are not shorted is within a predetermined error range. Accordingly, the collector region and the emitter region may be manufactured so that whether the collector region and the emitter region are shorted may be randomly determined.

In a typical BJT process, the above result may be determined as a process failure. Also, a collector region and an emitter region may be shorted by a designed effective base width or widths of depletion regions, and accordingly a semiconductor may be determined as a defective product.

However, by the above process failure (that is, a phenomenon recognized as a failure in a typical BJT manufacturing process), an unpredictable short circuit phenomenon may occur between the collector region and the emitter region. A physical unclonable function (PUF) may be generated based on a result of the above random short circuit phenomenon.

The above random process failure may be caused by formation of a channel between the collector region and the emitter region even though the BJT is not turned on while the distance between the first depletion region and the second depletion region decreases.

The effective base width and/or the width of the first depletion region and the width of the second depletion region may be adjusted during a semiconductor design process. However, this is merely an example, and it is possible to create the same result through an operation in a semiconductor process even though a design corresponds to a typical BJT. Accordingly, even though a portion of a design or a manufacturing process is described hereinafter, there is no limitation to some embodiments by the above description.

As described above, by adjusting the effective base width and/or the width of the first depletion region and the width of the second depletion region, the collector region and the emitter region may be shorted. However, whether the collector region and the emitter region are shorted may not be predicted, which may guarantee randomness of a digital value generated by the PUF.

When a separate process is not performed after a manufacturing process of a BJT is performed, whether a short circuit occurs during the manufacturing process may remain unchanged. Thus, time-invariance of a digital value generated by the PUF may be guaranteed at a high level.

Furthermore, even though a BJT is manufactured based on the same process parameter, for example, semiconductor materials or a doping concentration, a process error of a certain level may be inevitable. Also, because it is impossible to control a behavior and occurrence of the process error to be beyond a predetermined range, whether a collector region and an emitter region of each of manufactured BJTs may be determined for each of the BJTs.

Accordingly, because different digital values are generated despite use of the same process parameter, a characteristic of the PUF, that is, a physical unclonability may be satisfied.

Thus, according to embodiments, in a design and/or a manufacturing process of a BJT, the BJT may be formed by adjusting an effective base width and/or a width of a first depletion region and a width of a second depletion region based on a design rule that specifies a base width to guarantee that existing punch-through does not occur, and thus whether a collector region and an emitter region are shorted may be randomly determined. By the above randomness, a PUF may be generated.

The design rule may be a design rule that ensures that an emitter and a collector of a BJT are not shorted due to punch-through. Hereinafter, unless otherwise mentioned, the design rule will be understood as described above.

However, adjustment of the effective base width, the width of the first depletion region and the width of the second depletion region is merely an example among BJT process parameters that may short the collector region and the emitter region. Accordingly, the adjustment should be understood to include an adjustment of an arbitrary BJT process parameter to short the collector region and the emitter region, and not limited to a portion of a configuration described as an example in the specification.

The reader 120 may determine whether a collector region and an emitter region of a manufactured BJT are shorted, and may provide an identification key as an output value.

In an example, when a BJT is manufactured as an NPN BJT, a typical turn-off voltage may be applied to a base region and an emitter region, and the BJT may be typically turned off. When the BJT is turned off, whether a collector region and the emitter region are shorted may be determined based on an output value. Also, a value of "0" or "1" may be output as an output value, and an identification key may be provided.

In another example, when a BJT is manufactured as a PNP BJT, a typical turn-off voltage may be applied to a base region and an emitter region, and the BJT may be typically turned off. When the BJT is turned off, whether a collector region and the emitter region are shorted may be determined based on an output value. Also, a value of "0" or "1" may be output as an output value, and an identification key may be provided.

A voltage less than a predetermined potential difference may be applied between a base and an emitter of a manufactured BJT. The predetermined potential difference may be less than a typical turn-off voltage to turn off a BJT. Also, the predetermined potential difference may be a low potential difference to turn off the BJT even though an effective base width of the BJT is equal to or greater than a first threshold and equal to or less than a second threshold. For example, a predetermined potential difference between a base and an emitter may be "0" volts (V).

Hereinafter, various examples of a structure of a BJT to which a typical process parameter is not applied will be further described.

Figure 2:
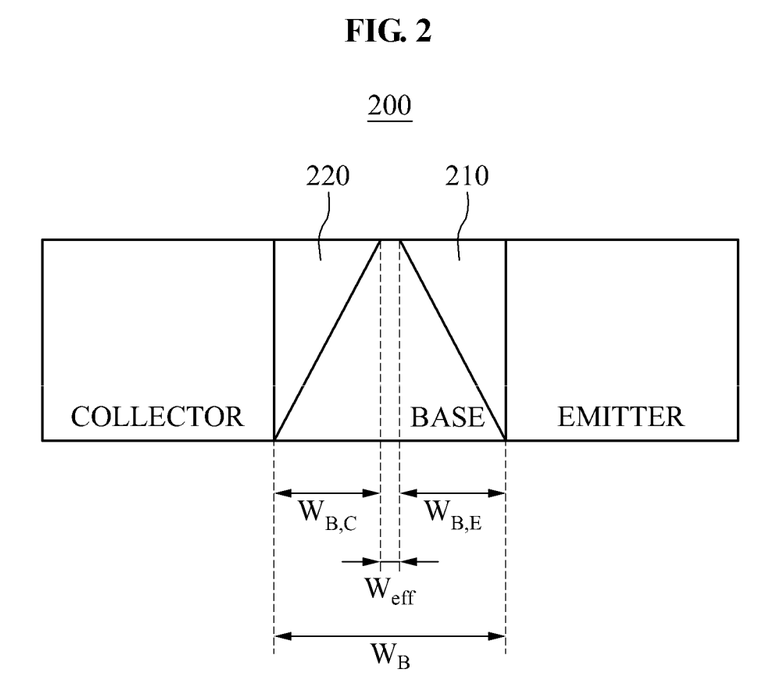
FIG. 2 is a diagram provided to describe a concept of a configuration of a bipolar junction transistor (BJT) according to an embodiment.

FIG. 2 is a diagram provided to describe a concept of a configuration 200 of a BJT according to an embodiment.

In the configuration 200 of the BJT, a first depletion region 210 may be formed by a junction between an emitter region and a base region, and a second depletion region 220 may be formed by a junction between a collector region and the base region. Also, a distance between the first depletion region 210 and the second depletion region 220 may be represented as an effective base width $W_{eff}$.

According to an existing design rule, the effective base width $W_{eff}$ may be designed to have a value equal to or greater than a typical value. When an effective base width is equal to or greater than a typical value, a predetermined distance between the first depletion region 210 and the second depletion region 220 may be secured. Accordingly, when a typical turn-on voltage is not supplied between the base region and the emitter region, a channel may not be formed, and accordingly a current may not flow.

Also, according to an existing rule, a difference between a width $W_B$ of the base region and a sum of a width $W_{BE}$ of the first depletion region 210 and a width $W_{BC}$ of the second depletion region 220 may be designed to be greater than a typical value. Here, a predetermined distance between the first depletion region 210 and the second depletion region 220 may be secured. Accordingly, when a typical turn-on voltage is not supplied between the base region and the emitter region, a channel may not be formed, and accordingly a current may not flow.

According to an embodiment, unlike the existing rule, the effective base width $W_{eff}$ may be equal to or greater than a first threshold and equal to or less than a second threshold. When the effective base width $W_{eff}$ is equal to or greater than the first threshold and equal to or less than the second threshold, the emitter region and the collector region may be randomly shorted. When the emitter region and the collector region are shorted, a current may flow between the emitter region and the collector region, even though the typical turn-on voltage is not supplied between the base region and the emitter region.

Accordingly, even though the BJT is turned off, a voltage of the emitter region may be applied to a voltage of the collector region, and a reader may identify the voltage and may provide an identification key as an output value. Because whether the emitter region and the collector region are shorted is randomly determined, randomness of a digital value generated by a PUF may be guaranteed.

Unlike the existing rule, the difference between the width $W_B$ of the base region and the sum of the width $W_{BE}$ of the first depletion region 210 and the width $W_{BC}$ of the second depletion region 220 may be designed to be equal to or greater than the first threshold and equal to or less than the second threshold. Here, the emitter region and the collector region may be probabilistically shorted. When the emitter region and the collector region are shorted, a current may flow between the emitter region and the collector region, even though the typical turn-on voltage is not supplied between the base region and the emitter region.

Accordingly, even though the BJT is turned off, a voltage of the emitter region may be applied to a voltage of the collector region, and a reader may identify the voltage and provide an identification key as an output value. Because whether the emitter region and the collector region are shorted is randomly determined, randomness of a digital value generated by a PUF may be guaranteed.

The above-described embodiments may be implemented by designing different process parameters in a design or by a process variation in a BJT manufacturing process. Also, whether the collector region and the emitter region are shorted may remain unchanged unless a separate BJT process is performed after a BJT is manufactured. Thus, time-invariance may also be guaranteed and the BJT may be used to generate a PUF.

A principle of an operation of probabilistically shorting the emitter region and the collector region according to the above-described embodiments is described with reference to FIG. 3.

Figure 3A:
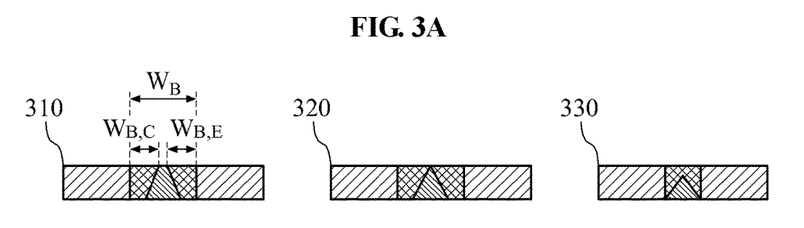
FIG. 3A is a diagram provided to describe a concept of an operation of a BJT based on a width of a base region and a width of a depletion region according to an embodiment.

FIG. 3A is a diagram provided to describe a concept of an operation of a BJT based on a width of a base region and a width of a depletion region according to an embodiment.

For example, when a BJT 310 is manufactured using an existing design process parameter, a width $W_B$ of a base region may be greater than a sum of a width $W_{BE}$ of a first depletion region and a width $W_{BC}$ of a second depletion region in the BJT 310.

In this example, when a typical turn-on voltage is not applied between the base region and an emitter region, the BJT 310 may be turned off. Accordingly, a current may not be generated between a collector region and the emitter region, and the collector region and the emitter region may be open.

In another example, when a BJT 320 is manufactured regardless of the existing design process parameter, a difference between a width $W_B$ of a base region and a sum of a width $W_{BE}$ of a first depletion region and a width $W_{BC}$ of a second depletion region may be equal to or greater than a first threshold and equal to or less than a second threshold in the BJT 320.

When the difference between the width $W_B$ of the base region and the sum of the width $W_{BE}$ of the first depletion region and the width $W_{BC}$ of the second depletion region is equal to or greater than the first threshold and equal to or less than the second threshold, a difference between a probability that a collector region and an emitter region are shorted and a probability that the collector region and the emitter region are not shorted may be within a predetermined error range.

In this example, for the first threshold and the second threshold, the first threshold and the second threshold may be a lower limit value and an upper limit value, respectively, in a range of the effective base width in which a difference between a probability that a collector region and an emitter region are shorted and a probability that the collector region and the emitter region are not shorted is within a predetermined error range. Accordingly, whether the collector region and the emitter region are shorted may be randomly determined.

Also, in this example, when a typical turn-on voltage is not applied between the base region and the emitter region, for example, when both the base region and the emitter region are connected to a ground, the collector region and the emitter region may be shorted, and a current may be generated in the BJT due to punch-through. On the contrary, when the collector region and the emitter region are not shorted, the current may not be generated.

A voltage less than a predetermined potential difference may be applied between a base and an emitter of a manufactured BJT. The predetermined potential difference may be less than a typical turn-off voltage to turn off a BJT. Also, the predetermined potential difference may be a low potential difference to turn off the BJT even though an effective base width of the BJT is equal to or greater than a first threshold and equal to or less than a second threshold. For example, a predetermined potential difference between a base and an emitter may be "0" V.

In a BJT 330, a width $W_B$ of a base region may be less than a sum of a width $W_{BE}$ of a first depletion region and a width $W_{BC}$ of a second depletion region. In the BJT 330, even though a typical turn-on voltage is not applied between the base region and an emitter region, a collector region and the emitter region may be shorted and a current may be generated due to punch-through.

Also, a principle of an operation of shorting the collector region and the emitter region by adjusting an effective base width may be the same as that described above.

An effective base width may refer to a distance between the first depletion region with the width $W_{BE}$ and the second depletion region with the width $W_{BC}$. In an example, when the effective base width is equal to or greater than a typical value, the same operation principle as that of the BJT 310 manufactured so that the width $W_B$ of the base region is greater than the sum of the width $W_{BE}$ of the first depletion region and the width $W_{BC}$ of the second depletion region may be provided.

In another example, when the effective base width is equal to or greater than the first threshold and equal to or less than the second threshold, the same operation principle as that of the BJT 320 manufactured so that the difference between the width $W_B$ of the base region and the sum of the width $W_{BE}$ of the first depletion region and the width $W_{BC}$ of the second depletion region is equal to or greater than the first threshold and equal to or less than the second threshold may be provided.

In still another example, when the effective base width has a negative value, the same operation principle as that of the BJT 330 manufactured so that the width $W_B$ of the base region is less than the sum of the width $W_{BE}$ of the first depletion region and the width $W_{BC}$ of the second depletion region may be provided.

As a result, a BJT for generation of a PUF may be designed so that a difference between a width $W_B$ of a base region and a sum of a width $W_{BE}$ of a first depletion region and a width $W_{BC}$ of a second depletion region is equal to or greater than a first threshold and equal to or less than a second threshold, or so that an effective base width is equal to or greater than the first threshold and equal to or less than the second threshold. Also, the effective base width and/or a width of a first depletion region and a width of a second depletion region may be adjusted during a semiconductor design process. However, this is merely an example, and it is possible to create the same result through an intended operation in a process.

Figure 3B:
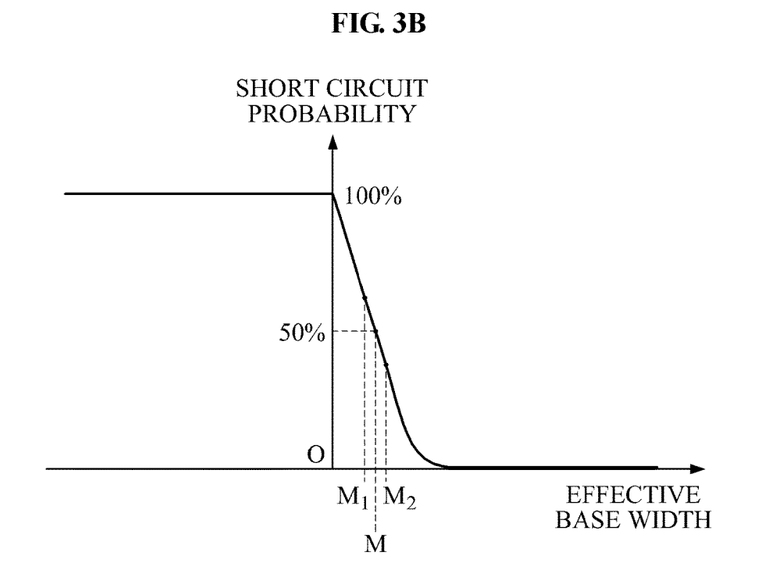
FIG. 3B is a graph illustrating a probability of a short circuit occurring between an emitter region and a collector region based on an effective base width according to an embodiment.

FIG. 3B is a graph illustrating a probability of a short circuit occurring between an emitter region and a collector region based on an effective base width according to an embodiment.

When an effective base width is equal to or greater than a typical value according to an existing design rule, the collector region and the emitter region may not be shorted as shown in the graph.

When the effective base width is equal to or less than "0," the collector region and the emitter region may overlap and may be shorted, and a current may flow at all times even though a typical turn-on voltage is not applied.

To use a BJT to generate a PUF by adjusting the effective base width, a range of the effective base width may need to be adjusted so that a probability of generation of a current by punch-through between a collector and an emitter may be about 50%.

Here, for a first threshold M1 and a second threshold M2, the first threshold M1 and the second threshold M2 may be a lower limit value and an upper limit value, respectively, in a range of the effective base width in which a difference between a probability that a collector region and an emitter region are shorted and a probability that the collector region and the emitter region are not shorted is within a predetermined error range.

When the effective base width is determined in a range between the first threshold M1 and the second threshold M2 as described above, a probability that a collector region and an emitter region of a BJT are shorted and a probability that the collector region and the emitter region are not shorted may be within a predetermined error range, and whether the collector region and the emitter region are shorted may be randomly determined. Also, when a separate process is not performed after a BJT is manufactured, whether a short circuit occurs during a manufacturing process may remain unchanged. Accordingly, time-invariance of a digital value generated by a PUF may be guaranteed at a high level, and thus the BJT may be used to generate a PUF.

A principle in an example in which a difference between a width of a base region and a sum of a width of a first depletion region and a width of a second depletion region needs to be equal to or greater than a first threshold and equal to or less than a second threshold may also be the same as the above-described principle of adjusting the effective base width.

Figure 4A:
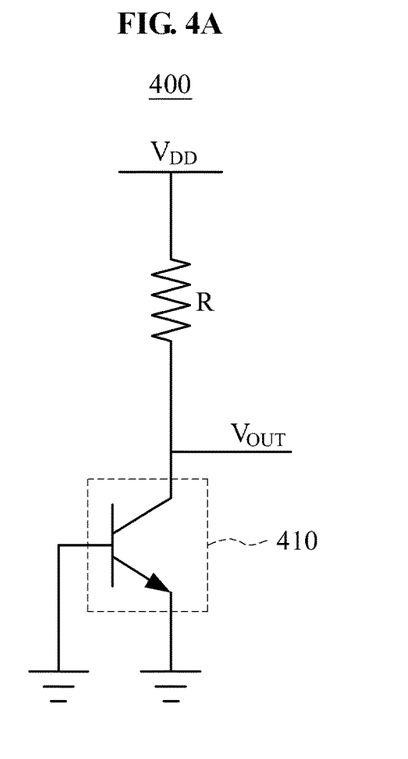
FIG. 4A illustrates a circuit of an identification key generation device including an NPN BJT according to an embodiment.

FIG. 4A illustrates a circuit 400 of an identification key generation device including an NPN BJT according to an embodiment.

A reader included in the identification key generation device with the NPN BJT may determine whether an emitter region and a collector region of the NPN BJT are shorted, based on an output value.

When the emitter region and the collector region are shorted, a current may flow between the emitter region and the collector region, and a voltage of the emitter region may be an output value. In an NPN BJT 410, an emitter region may be connected to a ground, and accordingly a voltage $V_{CE}$ between a collector region and the emitter region may have a value close to "0." The value of the voltage $V_{CE}$ may be regarded as an output value of "0."

When the emitter region and the collector region are not shorted, a current may not flow between the emitter region and the collector region, and the voltage of the emitter region may not be transferred as an output value. Accordingly, a value of $V_{DD}$ may be an output value to be read as "1."

As described above, whether a short circuit probabilistically occurs in the BJT 410 may be determined based on an output value of the reader. Also, whether the collector region and the emitter region are shorted may be probabilistically determined in a manufacturing process of the BJT 410, and thus randomness may be guaranteed. In addition, whether the collector region and the emitter region are shorted may remain unchanged due to a predetermined factor after the BJT 410 is manufactured, and thus time-invariance may also be guaranteed.

Figure 4B:
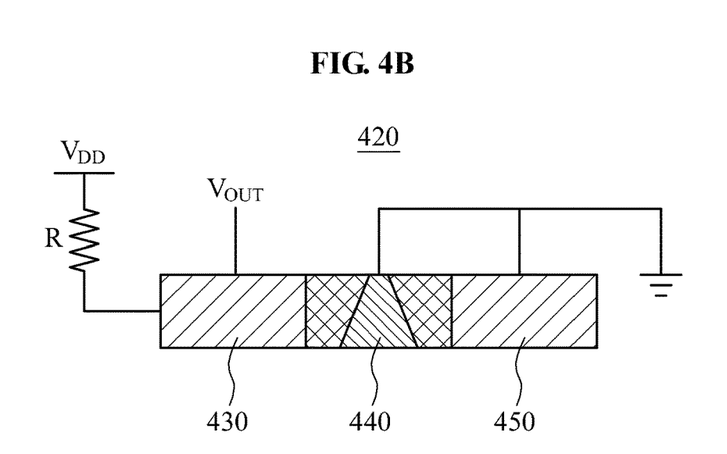
FIG. 4B illustrates a cross section of an NPN BJT according to an embodiment.

FIG. 4B illustrates a cross section of an NPN BJT 420 according to an embodiment.

A base region 440 and an emitter region 450 of the NPN BJT may be connected to a ground, and accordingly the NPN BJT may be turned off. In an example, when a difference between a width $W_B$ of a base region and a sum of a width $W_{BE}$ of a first depletion region and a width $W_{BC}$ of a second depletion region is not equal to or less than a typical value, a collector region 430 and the emitter region 450 may not be shorted.

In another example, when the difference between the width $W_B$ of the base region and the sum of the width $W_{BE}$ of the first depletion region and the width $W_{BC}$ of the second depletion region is equal to or greater than a first threshold and equal to or less than a second threshold, whether a short circuit occurs may be randomly determined.

When the collector region 430 and the emitter region 450 are not shorted, an output value may be "1" due to $V_{DD}$ connected to the collector region 450, instead of a ground voltage applied to the emitter region 430.

When the collector region 430 and the emitter region 450 are shorted, a current may flow between the collector region 430 and the emitter region 450, and a voltage of the emitter region 450 may be an output value. Because the emitter region 450 of the NPN BJT 420 is connected to the ground, a voltage $V_{CE}$ between the collector region 430 and the emitter region 450 may have a value close to "0," and the value of the voltage $V_{CE}$ may be regarded as an output value of "0."

As described above, a reader may determine whether a short circuit occurs in an NPN BJT, may output a value of "0" or "1" as an output value, and may provide an identification key.

Figure 5A:
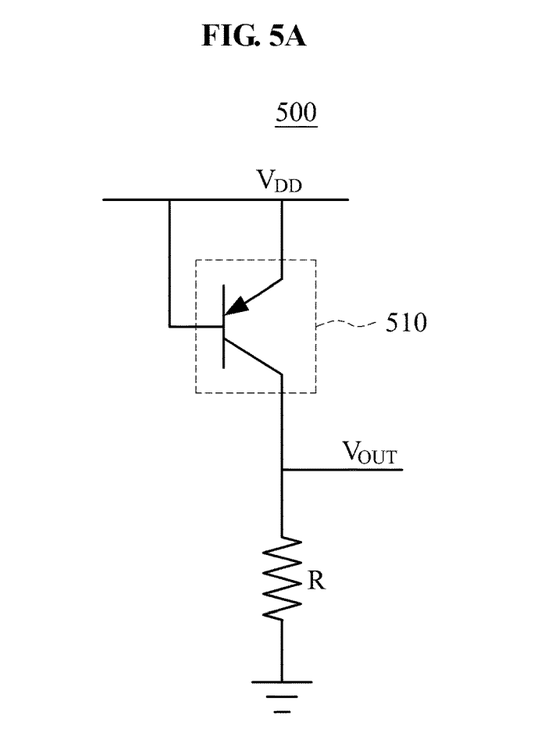
FIG. 5A illustrates a circuit of an identification key generation device including a PNP BJT according to an embodiment.

FIG. 5A illustrates a circuit 500 of an identification key generation device including a PNP BJT according to an embodiment.

A reader included in the identification key generation device with the PNP BJT may determine, based on an output value, whether an emitter region and a collector region of a PNP BJT 510 are shorted.

An operation principle of the identification key generation device including the PNP BJT may be the same as the operation principle of the identification key generation device including the NPN BJT of FIG. 4, except that the emitter region and a base region are connected to $V_{DD}$ and that the collector region is connected to the ground through a resistor.

In other words, when a difference between a width $W_B$ of the base region and a sum of a width $W_{BE}$ of a first depletion region and a width $W_{BC}$ of a second depletion region is equal to or greater than a first threshold and equal to or less than a second threshold, and when the emitter region and the collector region are shorted, a voltage $V_{CE}$ between the collector region and the emitter region may have a value close to "0." Thus, an output value may be regarded as "1" due to $V_{DD}$ applied to the emitter region. When the emitter region and the collector region are not shorted, the output value may be read as "0" because the collector region is connected to the ground through the resistor.

As described above, whether a short circuit occurs in a PNP BJT may also be randomly determined by the reader, and an identification key may be provided as an output value. In addition, whether the emitter region and the collector region are shorted may be probabilistically determined in a manufacturing process of the PNP BJT, and thus randomness and time-invariance may be guaranteed.

Figure 5B:
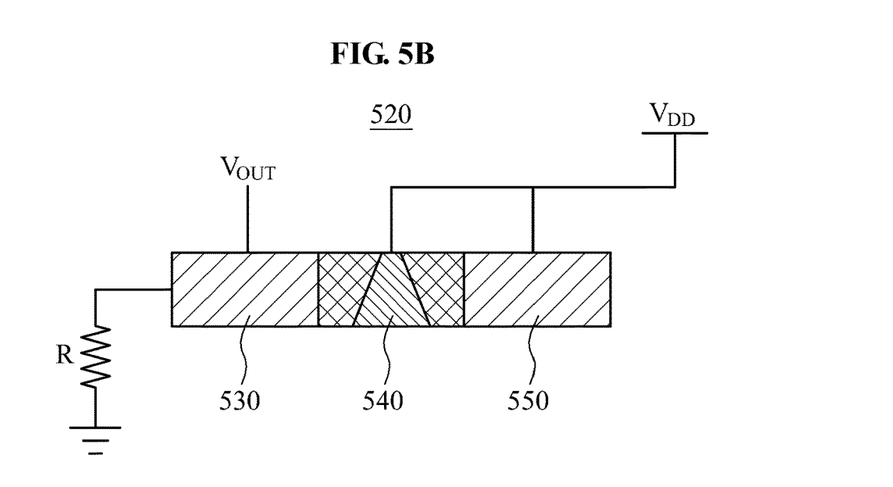
FIG. 5B illustrates a cross section of a PNP BJT according to an embodiment.

FIG. 5B illustrates a cross section of a PNP BJT 520 according to an embodiment.

A base region 540 and an emitter region 550 of the PNP BJT may be connected to $V_{DD}$, and accordingly the PNP BJT may be turned off. In an example, when a difference between a width $W_B$ of a base region and a sum of a width $W_{BE}$ of a first depletion region and a width $W_{BC}$ of a second depletion region is equal to or greater than a typical value, a collector region 530 and the emitter region 550 may not be shorted.

In another example, when the difference between the width $W_B$ of the base region and the sum of the width $W_{BE}$ of the first depletion region and the width $W_{BC}$ of the second depletion region is equal to or greater than a first threshold and equal to or less than a second threshold, whether a short circuit occurs may be randomly determined.

When a collector region and an emitter region are not shorted, an output value may be "0" due to a ground connected to the collector region, instead of $V_{DD}$ applied to the emitter region.

When the collector region 430 and the emitter region 450 are shorted, a voltage $V_{CE}$ between the collector region and the emitter region may have a value close to "0." Thus, an output value may be regarded as "1" due to $V_{DD}$ applied to the emitter region. Accordingly, even though the PNP BJT is turned off, the same voltage as $V_{DD}$ applied to the emitter region 550 may be transferred to the collector region 530, and the output value may be "1."

As described above, a reader may determine whether a short circuit occurs in a PNP BJT, may output a value of "0" or "1" as an output value, and may provide an identification key.

Figure 6:
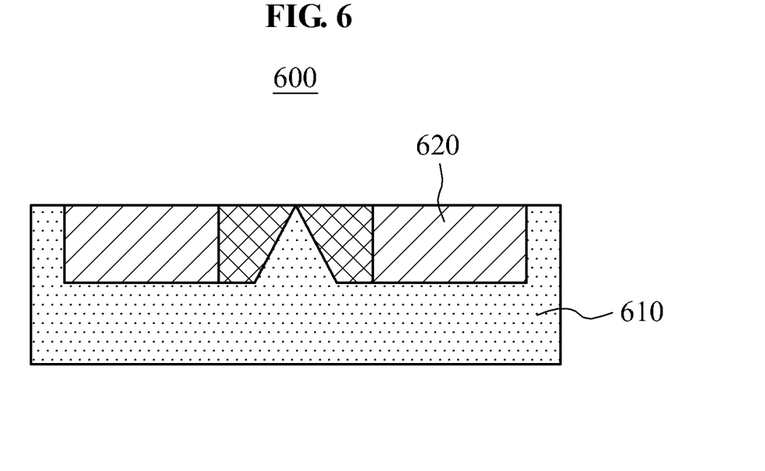
FIG. 6 illustrates a parasitic NPN BJT using an N-well and a P-substrate according to an embodiment.

FIG. 6 illustrates a parasitic NPN BJT 600 using an N-well and a P-substrate according to an embodiment.

A parasitic BJT may be formed by various N+/P+ regions in a general complementary metal-oxide semiconductor (CMOS) process.

The parasitic NPN BJT 600 may be formed using an N-well and a P-substrate in the general CMOS process.

In the parasitic NPN BJT 600, a collector region and an emitter region may be formed as N-wells 620, and a base region may be formed as a P-substrate 610.

In the general CMOS process, an interval equal to or greater than a predetermined interval between N-wells may be specified in a design rule. However, when an interval between N-wells is formed to be equal to or greater than a first threshold and equal to or less than a second threshold as described above with reference to FIG. 3, whether the collector region and the emitter region are shorted may be probabilistically determined by a process variation. Thus, the parasitic NPN BJT 600 may be used to generate a PUF.

Figure 7:
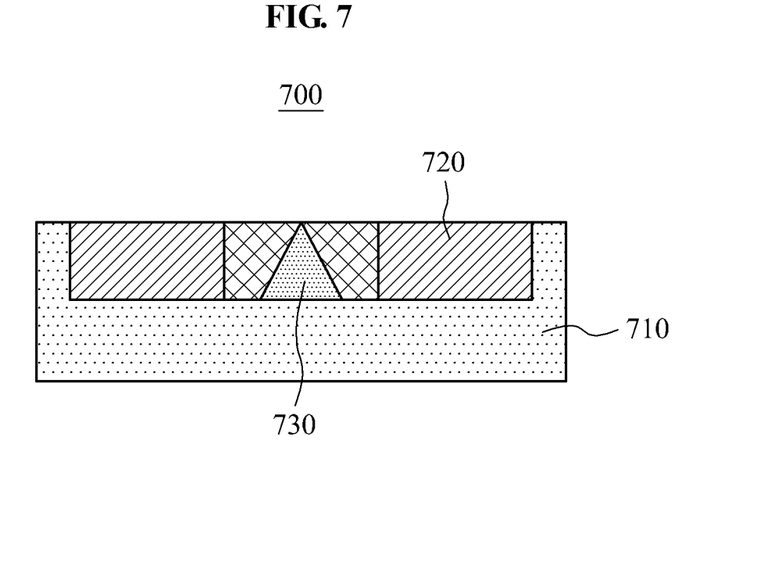
FIG. 7 illustrates a parasitic NPN BJT 700 using an N+ active region and a P+ active region according to an embodiment.

FIG. 7 illustrates a parasitic NPN BJT 700 using an N+ active region and a P+ active region according to an embodiment.

The parasitic NPN BJT 700 may be formed using an N+ active region and a P+ active region in a general CMOS process.

In the parasitic NPN BJT 700, a collector region and an emitter region may be formed on a P-substrate 710. The collector region and the emitter region may be formed as N+ active regions 720, and a base region may be formed as a P+ active region 730.

In the general CMOS process, an interval equal to or greater than a predetermined interval between N+ active regions may be specified in a design rule. However, when an interval between N+ active regions is formed to be equal to or greater than a first threshold and equal to or less than a second threshold as described above with reference to FIG. 3, whether the collector region and the emitter region are shorted may be probabilistically determined by a process variation. Thus, the parasitic NPN BJT 700 may be used to generate a PUF.

Figure 8:
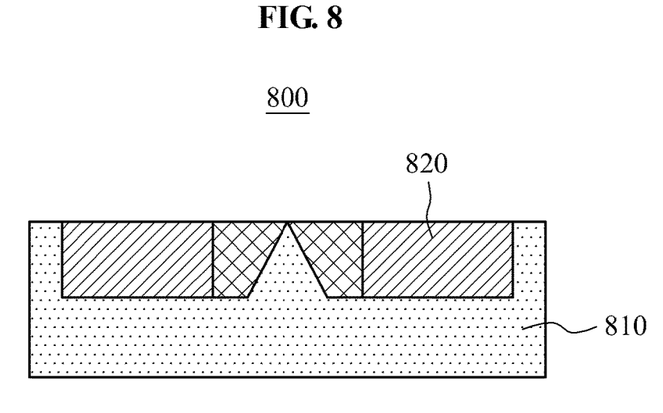
FIG. 8 illustrates a parasitic NPN BJT using an N+ active region and a P-substrate according to an embodiment.

FIG. 8 illustrates a parasitic NPN BJT 800 using an N+ active region and a P-substrate according to an embodiment.

The parasitic NPN BJT 800 may be formed using an N+ active region and a P-substrate.

In the parasitic NPN BJT 800, a collector region and an emitter region may be formed as N+ active regions 820, and a base region may be formed as a P-substrate 810.

In a general CMOS process, an interval equal to or greater than a predetermined interval between N+ active regions may be specified in a design rule. However, an interval between N+ active regions may be formed to be equal to or greater than a first threshold and equal to or less than a second threshold as described above with reference to FIG. 3.

When the interval between the N+ active regions is formed as described above, whether the collector region and the emitter region are shorted may be probabilistically determined by a process variation, and may not be affected by an external factor. Thus, the parasitic NPN BJT 800 may be used to generate a PUF.

Figure 9:
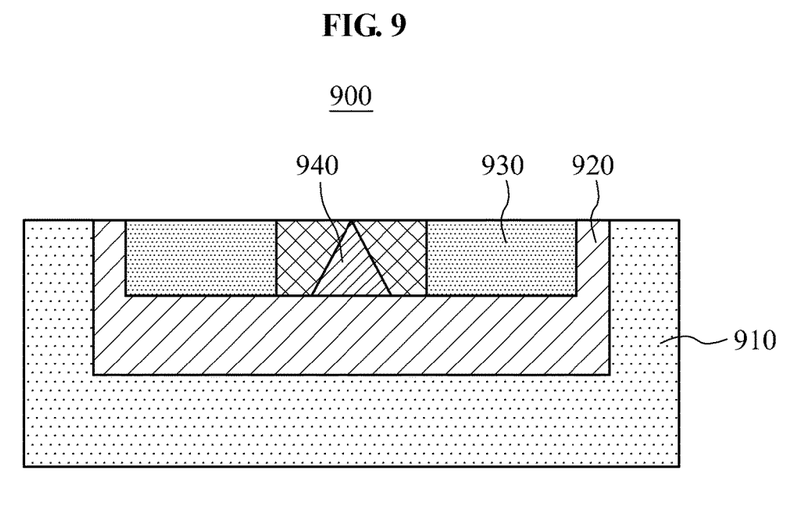
FIG. 9 illustrates a parasitic PNP BJT using an N+ active region and a P+ active region according to an embodiment.

FIG. 9 illustrates a parasitic PNP BJT 900 using an N+ active region and a P+ active region according to an embodiment.

The parasitic PNP BJT 900 may be formed using an N+ active region and a P+ active region in a general CMOS process.

In the parasitic PNP BJT 900, a P-substrate 910 may surround an N-well 920. Also, an emitter region and a collector region may be formed as P+ active regions 930, and a base region may be formed as an N+ active region 940, in a CMOS process.

In the general CMOS process, an interval equal to or greater than a predetermined interval between P+ active regions may be specified in a design rule. However, an interval between P+ active regions may be formed to be equal to or greater than a first threshold and equal to or less than a second threshold as described above with reference to FIG. 3.

When the interval between the P+ active regions is formed as described above, whether the collector region and the emitter region are shorted may be probabilistically determined by a process variation. Thus, the parasitic PNP BJT 900 may be used to generate a PUF.

Figure 10:
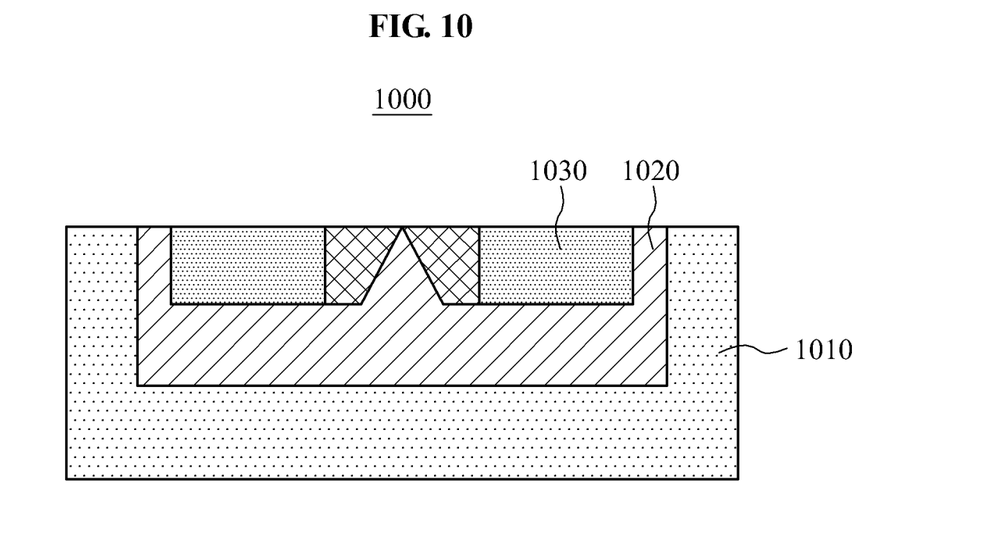
FIG. 10 illustrates a parasitic PNP BJT using a P+ active region and an N-well according to an embodiment.

FIG. 10 illustrates a parasitic PNP BJT 1000 using a P+ active region and an N-well according to an embodiment.

The parasitic PNP BJT 1000 may be formed using a P+ active region and an N-well.

In the parasitic PNP BJT 1000, a collector region and an emitter region may be formed as P+ active regions 1030, and a base region may be formed as an N-well 1020. A P-substrate 1010 may surround the N-well 1020.

In a general CMOS process, an interval equal to or greater than a predetermined interval between P+ active regions may be specified in a design rule. However, an interval between P+ active regions may be formed to be equal to or greater than a first threshold and equal to or less than a second threshold as described above with reference to FIG. 3.

When the interval between the P+ active regions is formed as described above, whether the collector region and the emitter region are shorted may be probabilistically determined by a process variation, and may not be affected by an external factor. Thus, the parasitic PNP BJT 1000 may be used to generate a PUF.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

The invention claimed is:

1. A device for generating an identification key, the device comprising:
   a bipolar junction transistor (BJT) having an effective base width equal to or greater than a first threshold and equal to or less than a second threshold; and
   a reader configured to provide an identification key value based on a determination of whether an emitter region and a collector region of the BJT are shorted when a base-emitter voltage of the BJT less than a predetermined potential difference is applied, the reader further configured to identify a voltage of the collector region and provide the identification key as an output value
   wherein the first threshold is a lower limit value of a range of the effective base width to allow a difference between a probability that the emitter region and the collector region are shorted and a probability that the emitter region and the collector region are not shorted to be within a predetermined error range, and
   wherein the second threshold is an upper limit value of the range.

2. The device of claim 1, wherein the BJT is designed so that the effective base width is equal to or greater than the first threshold, and is equal to or less than the second threshold.

3. The device of claim 1, wherein a time-invariant digital value is provided based upon whether the emitter region and the collector region are shorted.

4. The device of claim 1, wherein the BJT comprises a parasitic BJT formed by at least one N+ region and at least one P+ region.

* * * * *